United States Patent [19]
Kaufer et al.

[11] Patent Number: 5,812,828
[45] Date of Patent: Sep. 22, 1998

[54] FUNCTION SIMULATION

[75] Inventors: Stephen L. Kaufer, Newton; Trivelore T. Ramgopal, Watertown; Arunachallam Sivakumar, Belmont, all of Mass.

[73] Assignee: Centerline Software, Inc., Cambridge, Mass.

[21] Appl. No.: 847,407

[22] Filed: Apr. 24, 1997

Related U.S. Application Data

[63] Continuation of Ser. No. 457,838, Jun. 1, 1995, abandoned.

[51] Int. Cl.$^6$ ............................................. G06F 17/50
[52] U.S. Cl. ........................................ 395/500; 364/578
[58] Field of Search ........................ 364/578; 395/500

[56] References Cited

U.S. PATENT DOCUMENTS

| | | | |
|---|---|---|---|
| 4,827,427 | 5/1989 | Hyouke | 364/489 |
| 5,101,491 | 3/1992 | Katzeff | 395/500 |
| 5,193,180 | 3/1993 | Hastings | 395/575 |
| 5,381,547 | 1/1995 | Flug et al. | 395/700 |
| 5,581,696 | 12/1996 | Kolawa et al. | 395/183.14 |

FOREIGN PATENT DOCUMENTS

| | | |
|---|---|---|
| 63-170767 | 11/1988 | Japan . |
| 0131434 | 3/1990 | Japan . |
| 02311947 | 3/1991 | Japan . |
| 05258002 | 1/1994 | Japan . |

OTHER PUBLICATIONS

Veritas Software Corporation; Veritas Vista™ Code Coverage Tools User's Guide, Chapters 2 and 5; 1600 Plymouth Street, Mountain View, California 94043, Sep., 1994.

Wall, "Systems for Late Code Modification," Working Paper, May 20–24, 1991.

Goldberg et al., WRL Technical Note TN–17, "MTOOL: A Method For Detecting Memory Bottlenecks," Dec. 1990.

Wall, WRL Research Report 86/3, "Global Register Allocation at Link Time," Oct. 28, 1986.

Wall, WRL Research Report 89/17, "Link–Time Code Modification," Sep. 1989.

PIXIE(1–sysV), RISC/os Reference Manual, pp. 1–2, Jan. 15, 1991.

Hastings et al., USENIX, "Purify: Fast Detection of Memory Leaks and Access Errors," pp, 125–136, Winter 1992.

Kaufer et al., USENIX Association, "Saber–C An Interpreter–based Programming Environment for the C Language" pp. 161–171, Summer USENIX 1988.

Deutsch et al., "A Flexible Measurement Tool For Software Systems," University of Califonia, Berkeley, pp. TA–3–7 through TA–3–12.

Ball et al., "Optimally Profiling and Tracing Programs," Technical Report #1031, Sep. 6, 1991.

Larus et al., University of Wisconsin Computer Sciences Technical Report 1083, "Rewriting Executable Files to Measure Program Behavior," Mar. 25, 1992.

Graham et al., "Practical Data Breakpoints: Design and Implementation," University of California, Berkeley.

Aral et al., "Non–Intrusive and Interactive Pofiling in Parasight," pp. 21–30, 1988.

McFarling, "Program Optimization for Instruction Caches," pp. 183–194, 1989.

Bishop, Software–Practice and Experience, "Profiling Under UNIX by Patching," vol. 17(10), 729–739 (Oct. 1987).

*Primary Examiner*—Emanuel Todd Voeltz
*Assistant Examiner*—Leigh Marie Garbowski
*Attorney, Agent, or Firm*—Fish & Richardson P.C.

[57] ABSTRACT

A computer implemented method of simulating a function. The method includes the step of instrumenting computer readable code to include simulation check instructions for each function, within the computer readable code, that is available for simulation.

51 Claims, 10 Drawing Sheets

Microfiche Appendix Included
(2 Microfiche, 188 Pages)

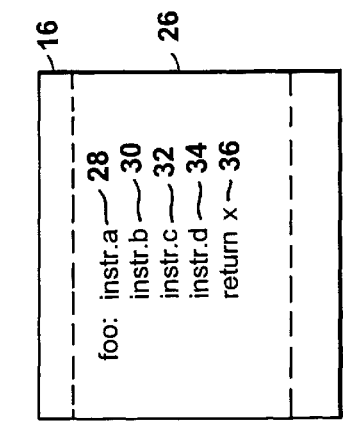
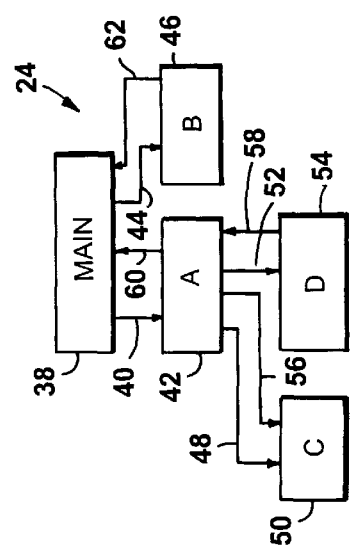
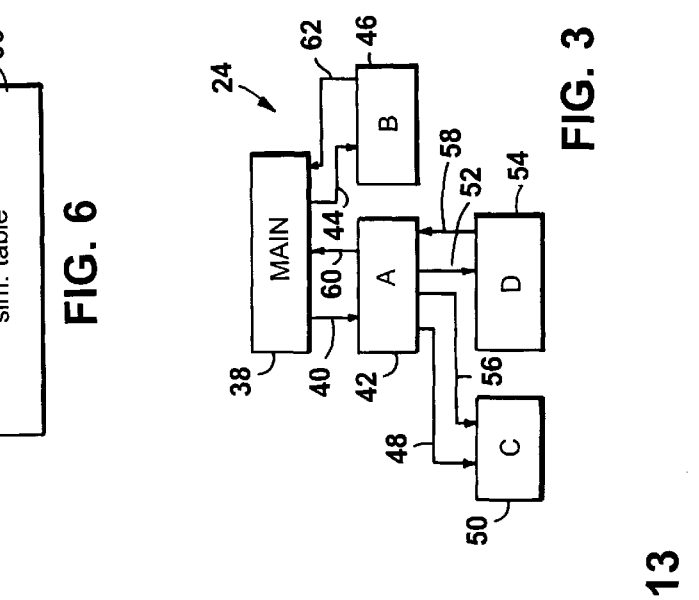
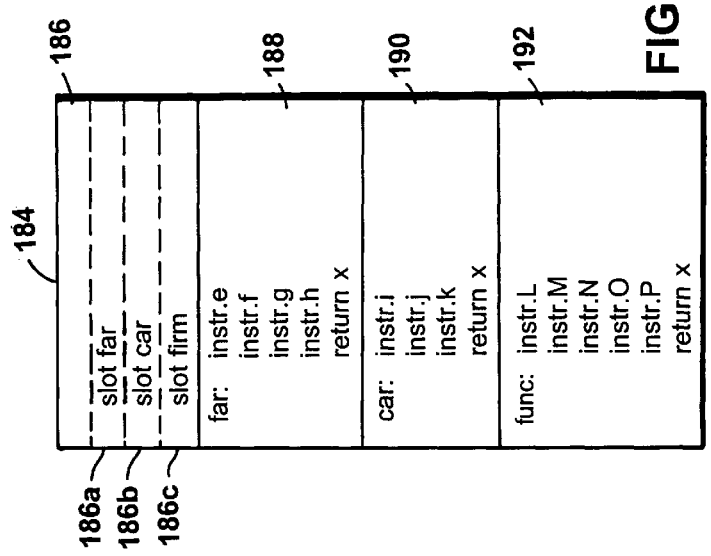

FUNCTION SIMULATION

This is a continuation of application Ser. No. 08/457,838, filed Jun. 1, 1995, now abandoned.

REFERENCE TO MICROFICHE APPENDIX

A microfiche appendix of C and C++ language source code for the preferred embodiment (©1994 Centerline Software, Inc.) consisting of 188 microfiche images on 2 pages is filed herewith. A portion of the disclosure of the patent document contains material which is subject to copyright protection. The copyright owners have no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to function simulation, and, in particular, to the instrumentation of object code such that functions expressed in object code may be simulated at run time.

BACKGROUND OF THE INVENTION

The source code for a programmer's application may be divided into many files some of which are written by the programmer and some of which, for example, libraries, may be written by third parties. The files may contain high-level language code, such as C, C++, Pascal, Fortran, Ada, or PL1, or the files may contain assembly language code. Language specific compliers are used to compile the high-level language code into object files or into assembly language files. An assembler then translates any assembly language files into object files. Each object file contains one or more functions, where a function is a series of instructions which when executed by a computer cause the computer to perform a specific task. A linker merges the object files into an executable file that contains machine (that is, computer) executable code.

One method of determining whether a programmer's application properly handles errors involves adding test code, which simulates one or more errors, to the application source code. For example, to test whether the application properly handles a disk full error, test code is inserted into the application source code which returns a disk full error whenever the save-to-disk function is called. Fully testing the application, however, could require adding test code to third party libraries for which source code is typically unavailable. Consequently, full testing of the application may not be possible. Moreover, whenever source code is altered, the possibility exists that errors will be injected into the application source code either through inadvertent changes to pre-existing code or through failure to remove all test code after testing.

SUMMARY OF THE INVENTION

In one aspect, the invention features a computer implemented method of simulating a function. The method includes the step of instrumenting computer readable code to include simulation check instructions for each function, within the computer readable code, that is available for simulation.

In another aspect, the method includes the step of instrumenting multiple object files to generate corresponding intermediate object files. The instrumenting step includes adding, for each function within the object files that is available for simulation, simulation check instructions to the intermediate object files. The method also includes generating a simulatable executable file from the intermediate object files and from a simulation object file.

In another aspect, the invention features a computer implemented method for instrumenting a set of pre-existing machine instructions to produce a set of modified machine instructions, where the machine language instructions are machine readable instructions executable by a computer processor. The set of modified machine instructions have the ability when executed to simulate one or more functions of the set of pre-existing machine instructions. The method includes instrumenting the set of pre-existing machine instructions to generate the set of modified machine instructions by adding simulation check instruction address space and simulation flags to the set of modified machine instructions for each function available for simulation within the set of pre-existing machine instructions. The method further includes linking the set of modified machine instructions and a simulation object file to generate a linked executable file and post-linking the linked executable file to generate a simulatable executable file. The method also includes inserting simulation check instructions into the simulation check instruction address space according to the simulation flags.

In another aspect, the method includes instrumenting the set of pre-existing machine instructions to generate the set of modified machine instructions and linking the set of modified machine instructions and a simulation object file to generate a linked executable file. In yet another aspect, the step of instrumenting the set of pre-existing machine instructions includes inserting simulation check instructions into the set of modified machine instructions for each function available for simulation within the set of pre-existing machine instructions.

Advantages of the invention may include one or more of the following. Each of the functions in a programmer's application may be simulated without altering the application's source code. Consequently, time may be saved by not having to re-compile the application's source code, and errors cannot be inadvertently injected into the application's source code. Further, a programmer's application may be fully tested without access to third party source code, and portions of the executable file that are executed only under rare conditions, typically error conditions that require special handling, may be simulated without causing the condition to actually occur. For instance, the code that controls disk failures may be tested by simulating a disk failure instead of waiting for or causing a disk to fail. Moreover, a programmer may specify which functions are to be simulated and when and how the simulations are to occur for each execution of the executable file, without having to re-compile source code or re-link object files.

BRIEF DESCRIPTION OF THE DRAWINGS

FIG. 2 is a block diagram of an object code file including one function;

FIG. 3 is a flow chart illustrating the relationship among a set of functions;

FIG. 6 is a block diagram of an object code file including one function instrumented in accordance with one embodiment of the invention;

FIG. 13 is a block diagram showing a shared library object file; and

DETAILED DESCRIPTION

This description is sufficiently detailed for an understanding of the invention, but for those interested in more details of implementation, a microfiche appendix containing the source code for the preferred embodiment is attached.

After instrumenting the object code as discussed below, the programmer may create (falsely) a particular operating condition, by simulating the function that would normally detect and report the particular operating condition. For example, to create a disk full condition, the programmer selects the save-to-disk function as the function to be simulated, selects a simulation condition (that is, when the simulation is to occur), for example, simulate the save-to-disk function every time it is called, and selects a simulation result (that is, what the simulation is to accomplish), for example, a result that indicates that the disk is full. In this example, the simulation result indicating that the disk is full is returned to all functions that call the save-to-disk function every time the save-to-disk function is called. During or after the execution of the executable file, the programmer determines whether the functions that called the save-to-disk function properly handled the disk full error.

Without writing any code, re-compiling, or re-linking, the programmer may select a new simulation condition and/or a new simulation result for the save-to-disk function and re-execute the executable file to further test the application, or the programmer may select one or more other functions for simulation and re-execute the executable file to test other code.

Figure 1:
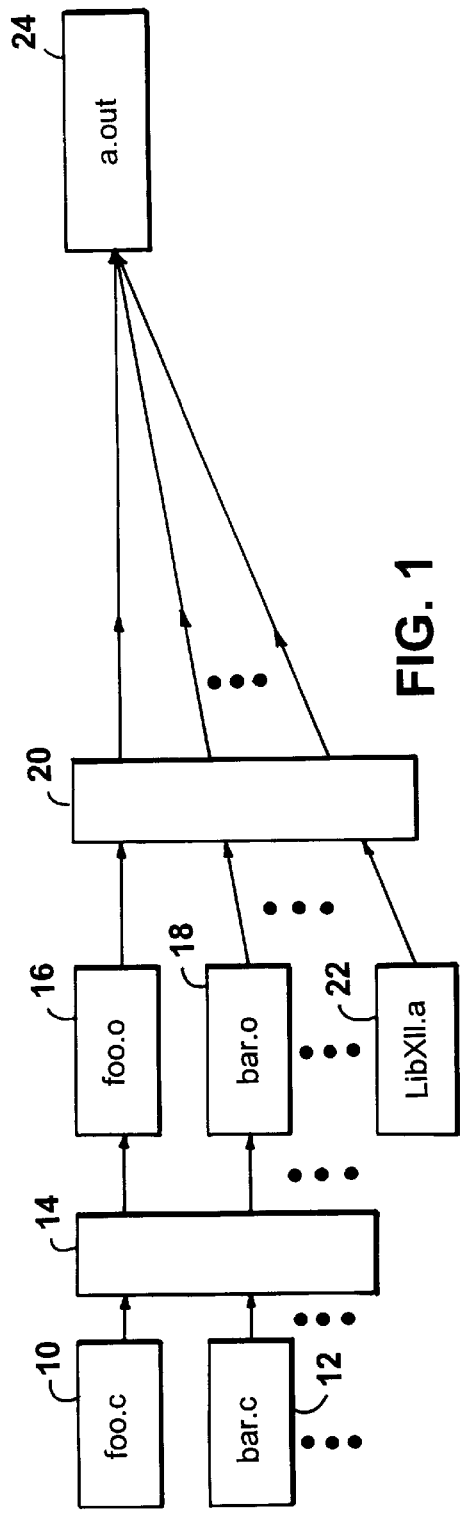
FIG. 1 is a block diagram showing the relationship between source code files, object files, and an executable file.

Referring to FIG. 1, a programmer generally writes many source code files foo.c 10 and bar.c 12 (for clarity, only two are shown, however, there may be many more) and then uses a compiler 14 to compile these files into object files foo.o 16, bar.o 18, respectively. The programmer then uses a linker 20 to link these object files 16, 18, as well as, other third party object files, such as a graphical user interface library, libX11.a 22, into an executable file a.out 24. Executable file a.out 24 consists of computer readable code (that is, ones and zeros) that represents the programmer's application.

Each object file 16, 18, 22 contains one or more functions, and each function contains one or more instructions. The instructions of each function may operate on one or more parameters (that is, arguments), and values for those parameters are passed to the function each time the function is called. Referring to FIG. 2, as an example, object file foo.o 16 includes one function, foo 26 (FIG. 2) that consists of several instructions, including, instr. a 28, instr. b 30, instr. c 32, instr. d 34, and return X 36. The last instruction of each function is generally a return instruction, for example, return X 36, that specifies a value, for example, X, to be returned to a function (not shown) that called function foo 26. Linker 20 links all of the functions within all of the object files, as is well known in the art, to form executable file a.out 24.

Referring to FIG. 3, as an example, executable file a.out 24 begins with a main function 38 including a call instruction that calls (arrow 40) a function A 42 and another call instruction that calls (arrow 44) a function B 46. Similarly, function A 42 includes a call instruction that calls (arrow 48) a function C 50 and a call instruction that calls (arrow 52) a function D 54. As shown, functions C 50 and D 54 do not include call instructions which call other functions. Functions C 50 and D 54, however, do end with return instructions which specify values to be returned (arrows 56, 58, respectively) to function A. Similarly, functions A 42 and B 46 end with return instructions which specify values to be returned (arrows 60, 62, respectively) to function main 38.

Figure 4:
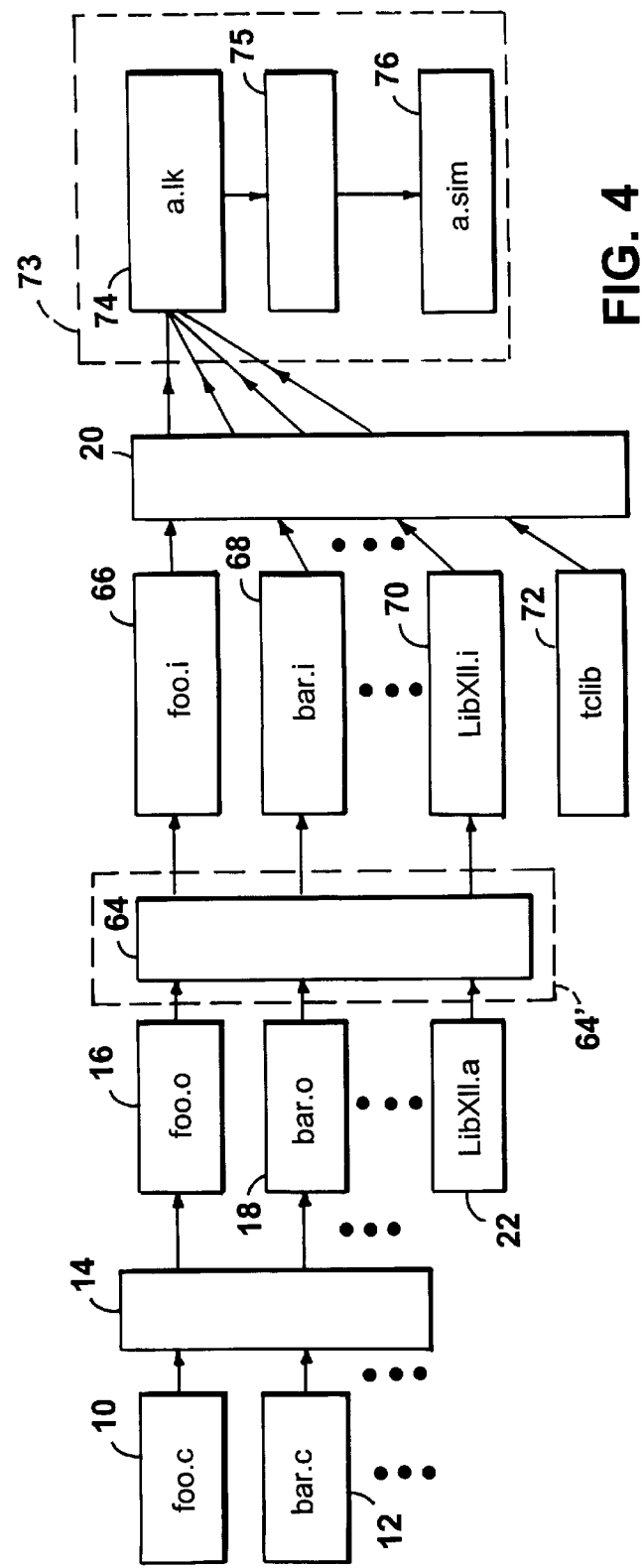
FIG. 4 is a block diagram showing the relationship between source code files, object files, instrumented object files, a linked executable file, and a simulatable executable file.

Referring to FIG. 4, in order to simulate one or more of the functions in object files 16, 18, 22, the object files are initially passed through an instrumentor 64 that generates intermediate object files foo.i 66, bar.i 68, libX11.i 70. As will be described in more detail below, for each function available for simulation in an object file on which the instrumentor operates, the instrumentor adds, within the intermediate object file, simulation check instruction address space 87 (FIG. 6) and simulation flags 89. Instrumentor 64 also generates a simulation table 90 (a table look-up) within each intermediate object file. The simulation table includes one entry for each function available for simulation within the intermediate object file, and each entry includes three slots. The instrumentor stores a relocation (that is, a linker command) in each of the three slots.

The intermediate object files 66, 68, 70 are then linked by a linker 20 with a simulation object file, designated in FIG. 4 as tclib object file 72, to form a linked executable file a.lk 74. Linker 20 responds to the relocations within the slots of the simulation tables by storing appropriate (described in detail below) address locations in the slots. The address stored in the first slot of each entry determines whether or not the corresponding function is selected (described below) for simulation and is equal to the address stored in either the associated second or third slot. Linked executable file a.lk 74 is then passed through a post-linker 75 to generate a simulatable executable file a.sim 76. Post-linker 75 searches the linked executable file a.sim 74 for simulation flags and in each instance where simulation flags are found, post-linker 75 adds simulation check instructions. Post-linker 75 also copies the corresponding function's first instruction (for example, instr. a 28, FIG. 2) into the added simulation check instructions and adds a branch instruction, at the original address location of the first instruction. The branch instruction points to the address location of the corresponding added simulation check instructions (that is, the branch instruction replaces the original first instruction). The address location added to the second slot of each entry of the simulation tables by the linker corresponds to the new address location of the first instruction, for example, instr. a 28, (that is, the address location within the simulation check instructions). The address location added to the third slot of each entry of the simulation tables by the linker corresponds to the address location of a branch instruction within the simulation check instructions which points to an address location within tclib containing simulation instructions. As will be described below, if the corresponding function is not selected for simulation, then the address stored in the first slot is equal to the address in the second slot. Whereas, if the corresponding function is selected for simulation, then the address stored in the first slot is equal to the address in the third slot.

Alternatively, aside from generating the simulation table, instrumentor 64 does not add simulation check instruction address space and simulation flags, but rather directly adds the simulation check instructions to intermediate object files for each function available for simulation. The instrumentor or the post-linker then copies the first instruction (for example, instr. a 28) of each function available for simulation into the added simulation check instructions.

As another alternative, separate instrumentor 64 and post-linker 75 are replaced by a more complex instrumentor 64', and within each object file having one or more functions available for simulation, complex instrumentor 64' adds simulation check instructions, generates a simulation table, and adds branch instructions, at the original address locations of the first instructions, that point to the address locations of corresponding added simulation check instructions. With such an arrangement, linker 20 directly generates simulatable executable file a.sim 76 (indicated by dashed line 73).

Instead of replacing the first instruction of each function with a branch instruction pointing to the added simulation check instructions, post-linker 75 or complex instrumentor 64' inserts the branch instruction before the address location of the function's first instruction (that is, the addresses of the first and any subsequent instructions are incremented and the first instructions are not copied into the added simulation check instructions). Generally, pre-existing function instructions contain many references to other pre-existing function instructions in terms of offsets (that is, in terms of the number of bytes separating the instructions in the object file). The insertion of the branch instruction before the first instruction (or the insertion of the simulation check instructions before the first instruction) changes the address location of the first instruction as well as the address locations of subsequent instructions and, as a result, may require the modification of one or more offsets, as discussed below. Consequently, the preferred method involves copying the first instruction into the added simulation check instructions and adding the branch instruction at the original address location of the first instruction.

Figure 5:
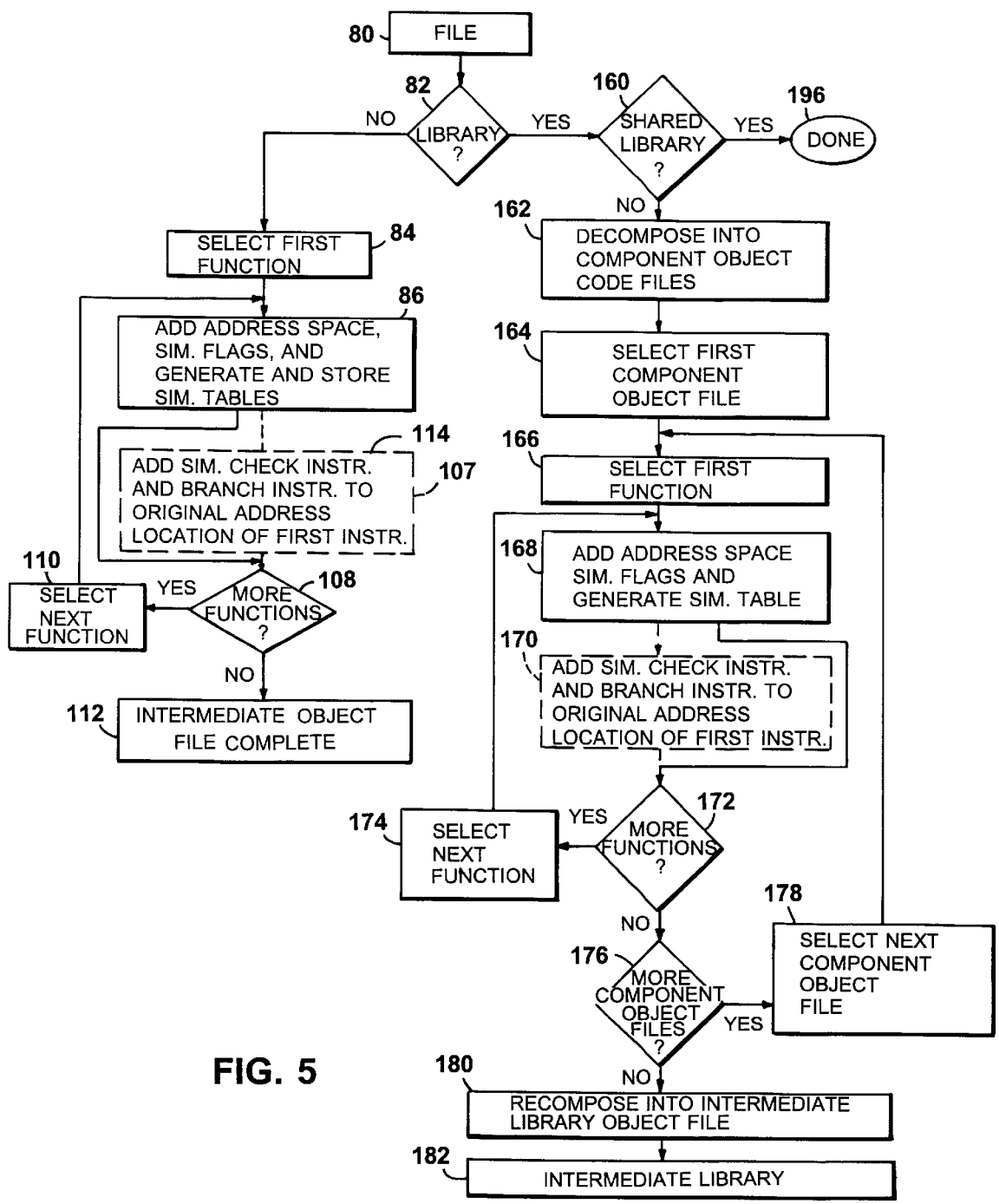
FIG. 5 is a flow chart of a general instrumentation method in accordance with one embodiment of the invention.

Referring to FIG. 5, a file 80, for example, foo.o 16 (FIG. 4), that contains one or more functions available for simulation, is operated on by instrumentor 64. A file that includes only functions that will not be made available for simulation does not have to be operated on by instrumentor 64. The execution of instrumentor 64 causes a computer (not shown) to begin by determining (step 82) whether or not the file is a library file (explained in more detail below). In this example, foo.o 16 is not a library file, and, as a result, the execution of instrumentor 64 causes the computer to select (step 84) a first function, foo 26 (FIG. 2), from within object file foo.o 16. Referring also to FIG. 6, the computer then adds (step 86) simulation check instruction address space 87 and simulation flags 89 to the intermediate object file, for example, foo.i 66, and generates and stores simulation table 90 in the intermediate object file.

Figure 7A:
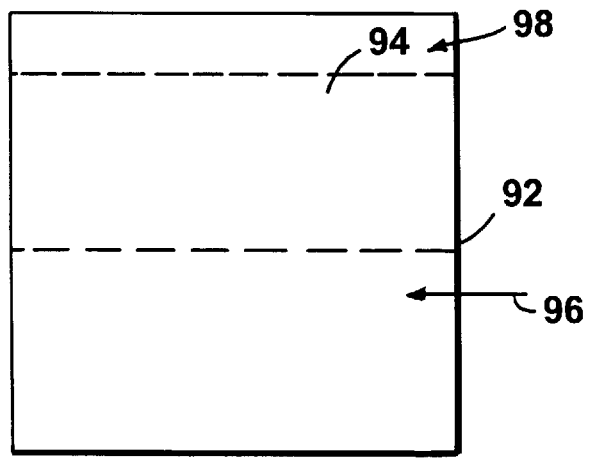
FIGS. 7a and 7b are block diagrams of object files including functions.

Referring to FIG. 7a, where an object file 92 includes only one function 94, instrumentor 64 may cause the computer to add the simulation check instruction address space either after (arrow 96) the pre-existing function instructions or before (arrow 98) the pre-existing function instructions. The pre-existing function instructions generally contain many references to other pre-existing function instructions in terms of offsets (that is, in terms of the number of bytes separating the instructions in the object file). Furthermore, the pre-existing function instructions, symbols, and relocation structures also contain references, often in the form of offsets, to pre-existing function data and instructions within the object file. Inserting address space for simulation check instructions before (arrow 98) pre-existing function instructions will generally change the location of subsequent instructions in the object file. Consequently, if the address space for the simulation check instructions is inserted before (arrow 98) pre-existing function instructions, each offset within the object file should be examined to determine if it requires modification and what modification is required to reflect the new positions of the pre-existing instructions and data, and then each offset requiring modification should be modified. Finding all possible offsets within a complex object file, determining what modification, if any, is required for each offset, and modifying offsets where appropriate may require a large amount of computer memory and time. Thus, it is preferable to add the address space for the simulation check instructions after (arrow 96) the pre-existing function instructions because such additions do not alter the locations of pre-existing instructions.

Figure 7B:
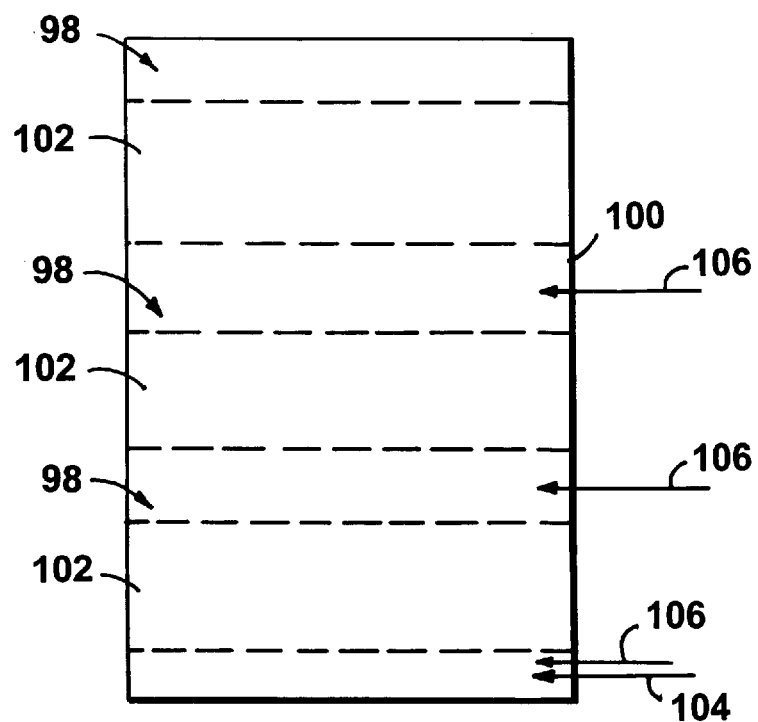

Referring to FIG. 7b, where an object file 100 includes multiple functions 102, instrumentor 64 may add the address space for the simulation check instructions after (arrow 104) all of the pre-existing function instructions, after (arrows 106) each function's pre-existing function instructions, or before (arrows 98) the pre-existing function instructions. Again, inserting the address space for the simulation check instructions before (arrows 98) the pre-existing function instructions will generally change the locations of subsequent instructions and, thus, require the examination of and possible modification to the offsets of each function. Where each function in an object file has its own unique sub-space, inserting the space for the simulation check instructions after (arrows 106) each set of pre-existing function instructions will generally not alter the location of subsequent instructions (that is, as long as there is sufficient space between function sub-spaces), and as a result, the offsets of the functions do not need to be examined or modified. Inserting the address space for the simulation check instructions after (arrow 104) all of the pre-existing function instructions also does not alter the location of subsequent instructions, and as a result, the offsets of the functions do not need to be examined or modified. Inserting the address space for the simulation check instructions after (arrow 104 and arrow 96, FIG. 7a) all of the pre-existing function instructions is preferred because whether the object files have one or more functions and whether or not the functions within an object file have unique sub-spaces such insertions always avoids altering the location of subsequent instructions.

Referring again to FIG. 5, after adding (step 86) the address space for the simulation check instructions within object file foo.i 66 for the function foo, instrumentor 64 then determines (step 108) whether object file foo.o 16 contains additional functions available for simulation (that is, one, several, or all functions within the object file may be flagged as available for simulation). If foo.o 16 contains additional functions available for simulation, then instrumentor 64 selects (step 110) a next function and returns to step 86. Because foo.o 16 does not contain additional functions, instrumentor 64 is finished (step 112) generating intermediate foo.i 66 (FIG. 4) and may repeat steps 80–112 for other object files, for example, bar.o 18 and libX11.a 22 (FIG. 4).

Figure 9A:
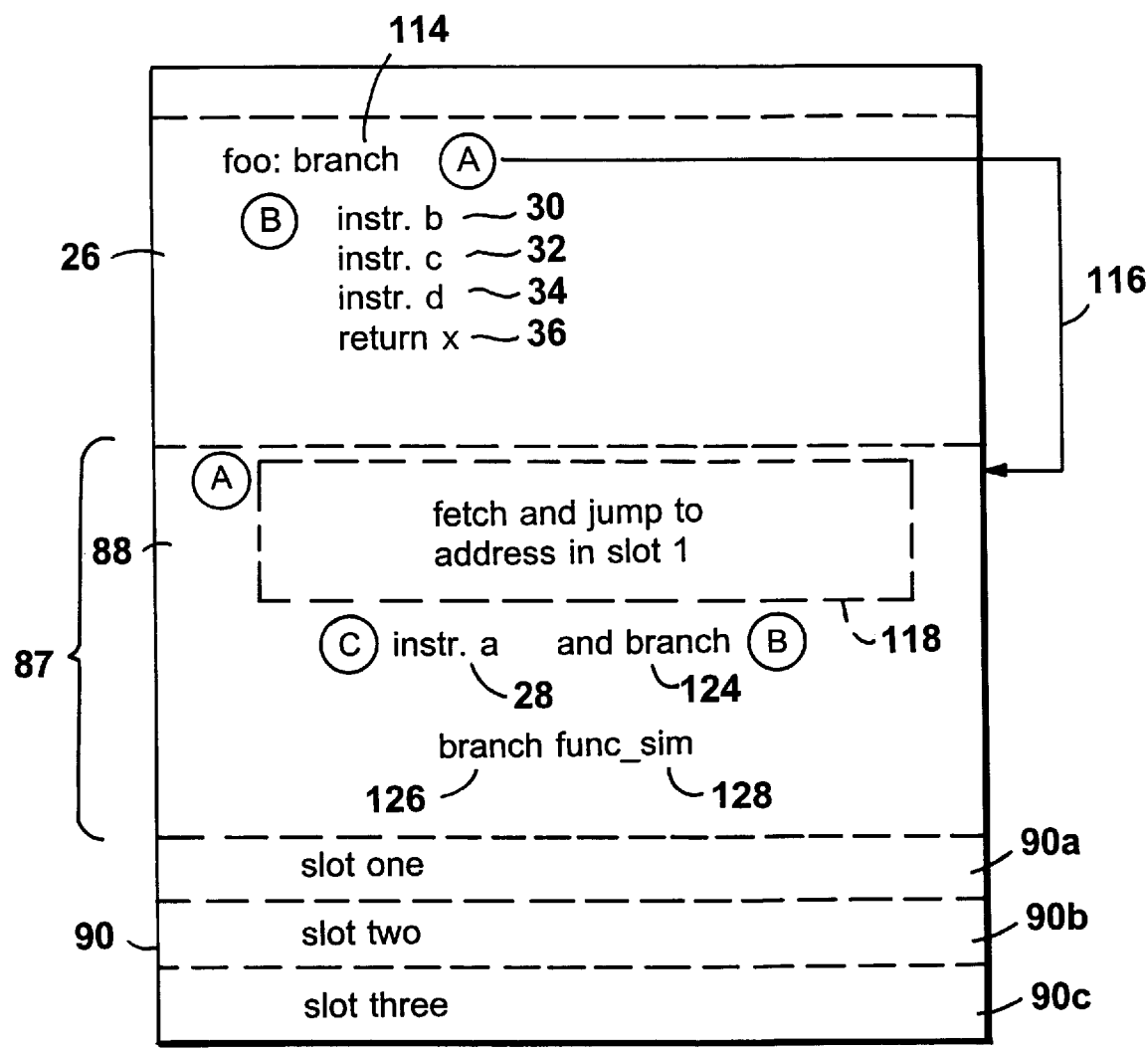
FIG. 9a is a more detailed block diagram of the object file and function of FIG. 6.

Referring to FIG. 9a, after linker 20 (FIG. 4) is used to link the intermediate object files into a.lk 74, post-linker 75 uses the simulation flags to add simulation check instructions 88 and branch instructions, for example, branch instruction 114, at the original address locations of the first instructions, for example, instr. a 28 (FIG. 2). Branch instruction 114 points to (arrow 116) the address location of inserted simulation check instructions 88. Alternatively, after the step (step 86, FIG. 5) of adding the simulation check instruction address space 87, a more complex instrumentor 64' (which, as mentioned above, is used instead of instrumentor 64 and post-linker 75, FIG. 4) includes an additional step (step 107) of adding simulation check instructions 88 and the branch instruction 114, pointing to (arrow 116) the address location of the added simulation check instructions, at the original address location of the first instruction of the function. Branch instruction 114 may be unnecessary if the simulation check instructions are added before (arrow 98, FIGS. 7a, 7b) the pre-existing function instructions.

Figure 8:
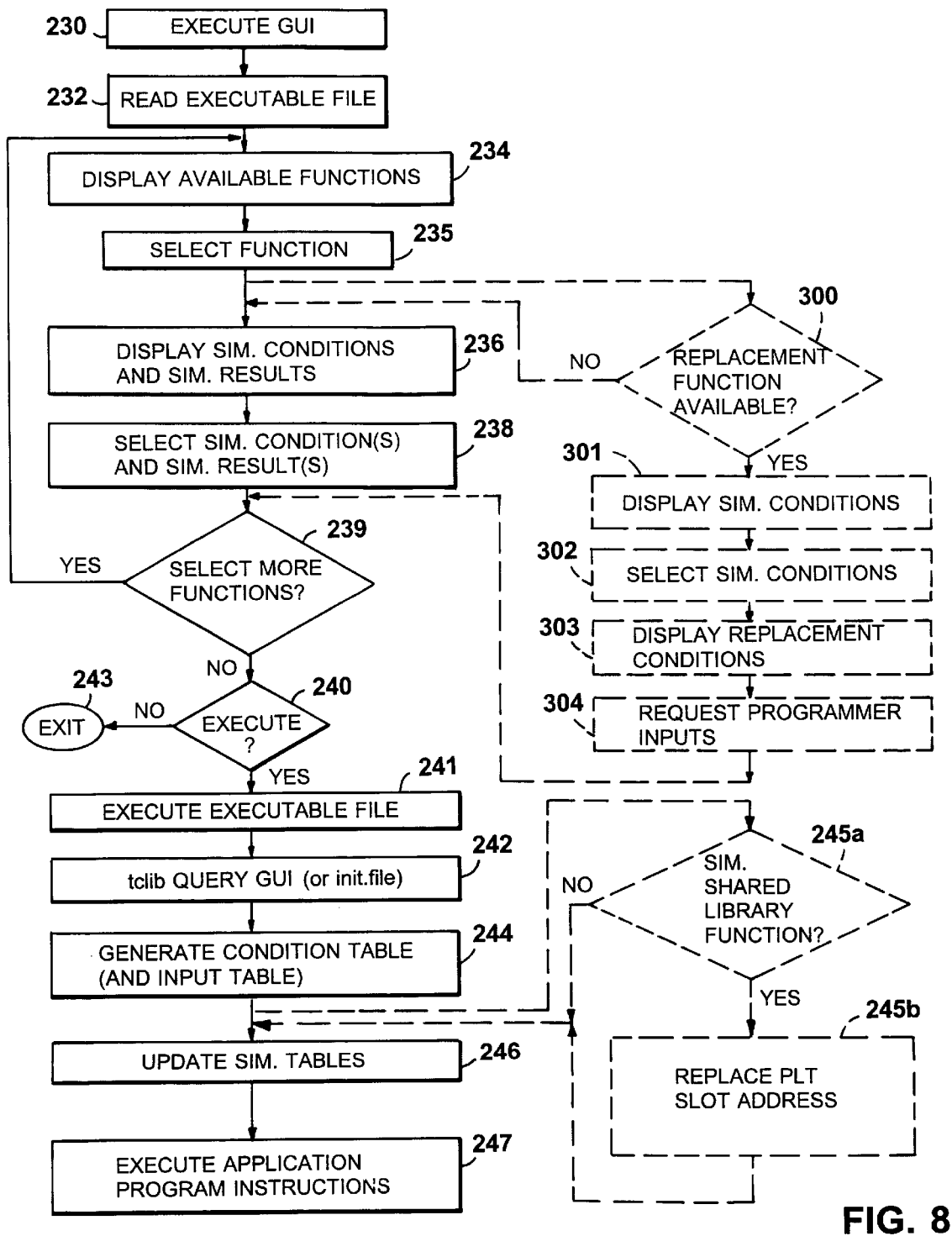
FIG. 8 is a flow chart of a general simulation method in accordance with one embodiment of the invention.

Prior to executing a.sim 76, a programmer, through an initialization file or a graphical user interface (GUI), selects one or more functions within a.sim 76 for simulation. At the same time, the programmer also selects one or more simulation conditions (that is, when the simulation is to occur) and one or more simulation results (that is, what the simulation is to accomplish). Referring to FIG. 8, when a computer executes (step 230) the GUI program, those instructions cause the computer to read (step 232) a.sim 76 to determine which functions are available for simulation and the possible simulation conditions and results associated with each function. The computer then displays (step 234) through the GUI (on a display screen, not shown) one or more of the functions (typically only replacement functions, described below, are displayed) from which the programmer can choose (step 235), with either a mouse device (not shown) or by typing the name of the function on a keyboard (not shown).

When the programmer chooses a particular function, the computer, through the GUI, displays (step 236) the available simulation conditions and simulation results corresponding to that function. Through the GUI, the programmer selects (step 238) one or more of the simulation conditions and simulation results for that function, and if additional functions are to be simulated (step 239), then steps 234–238 are repeated for each additional function. The GUI maintains a list of the functions selected for simulation and the selected simulation conditions and simulation results associated with the selected function. Where an initialization file is used, the programmer includes at least one line of directives for each function to be simulated (the line of directives includes the name of the function to be simulated, the simulation condition, and the simulation result). If the same function is to be simulated under multiple simulation conditions, then the programmer includes a line of directives corresponding to each condition. When using an initialization file, the programmer must know, for example, by reading the source code, which functions are available for simulation and the available simulation conditions and simulation results associated with each function. Hence, the GUI is the preferred method of selecting the functions to be simulated.

The programmer may then choose (step 240) to have the computer execute (step 241) a.sim 76 or to exit (step 243) out of the GUI. Upon the execution of a.sim 76, instructions within tclib 72 (which is now a part of a.sim 76) cause the computer to query (step 242) either the initialization file or the GUI list to determine which functions have been selected for simulation, and the simulation conditions and simulation results chosen for each function. With this information, the tclib 72 instructions cause the computer to generate (step 244) a condition table. For each function selected for simulation, the condition table includes an entry that stores the selected simulation condition(s) and simulation result(s) corresponding to that function. After generating (step 244) the condition table, the computer updates (step 246) the simulation tables in the executable file such that the first slot, of each entry corresponding to a function selected for simulation, is set equal to the address in the third slot of the same entry. The computer then executes (step 247) the remaining application program instructions within a.sim 76.

The simulation tables can be replaced by additional simulation check instructions which examine the condition table to determine if a function has been selected for simulation. If simulation conditions corresponding to the function are listed in the condition table, then the function has been selected for simulation. This would save the memory space required to save the simulation tables; however, in general, the execution will be slower.

Figure 9B:
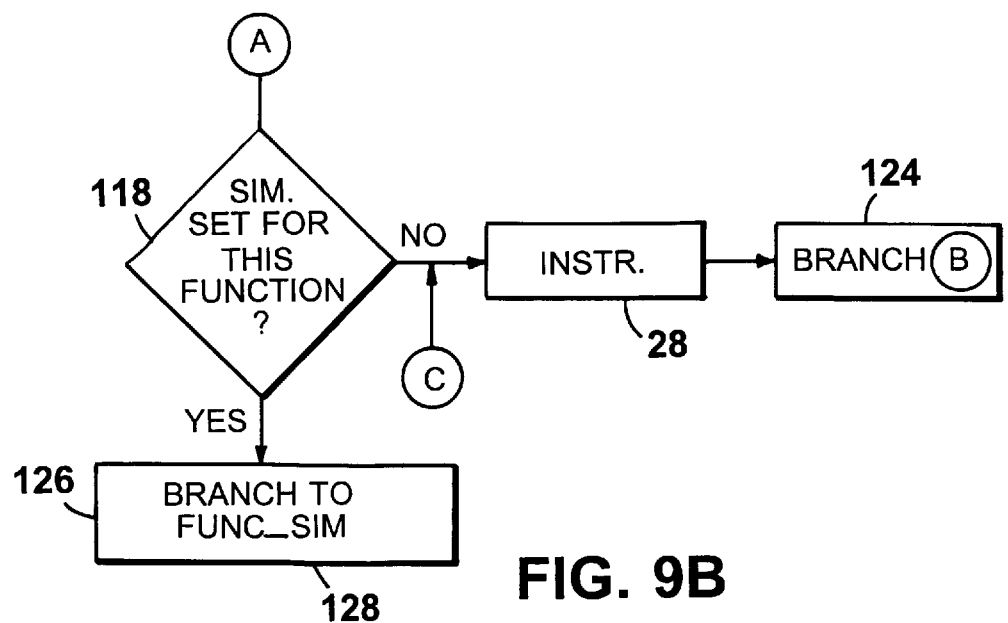
FIG. 9b is a flow chart of a general execution of simulation check instructions.

Referring to FIGS. 9a and 9b, when a.sim 76 is run and function foo 26 is called from another function (not shown), branch instruction 114 causes the computer to jump (arrow 116) over pre-existing instructions 30, 32, 34, and 36 and determine (step 118) whether the function was selected for simulation. This determining step involves fetching and jumping to an address stored in the first slot (slot one 90a) of an entry in simulation table 90 that corresponds to the function, for example, foo. If the programmer did not select function foo for simulation, then the address in the first slot is equal to the address in the second slot (slot two 90b) which corresponds to the address, within the simulation check instructions, of the copied first function instruction, for example, instr. a 28. As a result, the computer executes the copied first instruction and then branches 124 back to the second instruction, for example, instr. b 30, to complete function foo normally. If the programmer did select function foo for simulation, then the address in the first slot is equal to the address in the third slot (slot three 90c) which corresponds to the address, within the simulation check instructions, of a branch instruction 126 that points to the address location, func_sim 128, of simulation instructions within tclib. As a result, the computer executes branch instruction 126 which causes the computer to branch to func_sim 128 (that is, the simulation instructions) within tclib.

Figure 10:
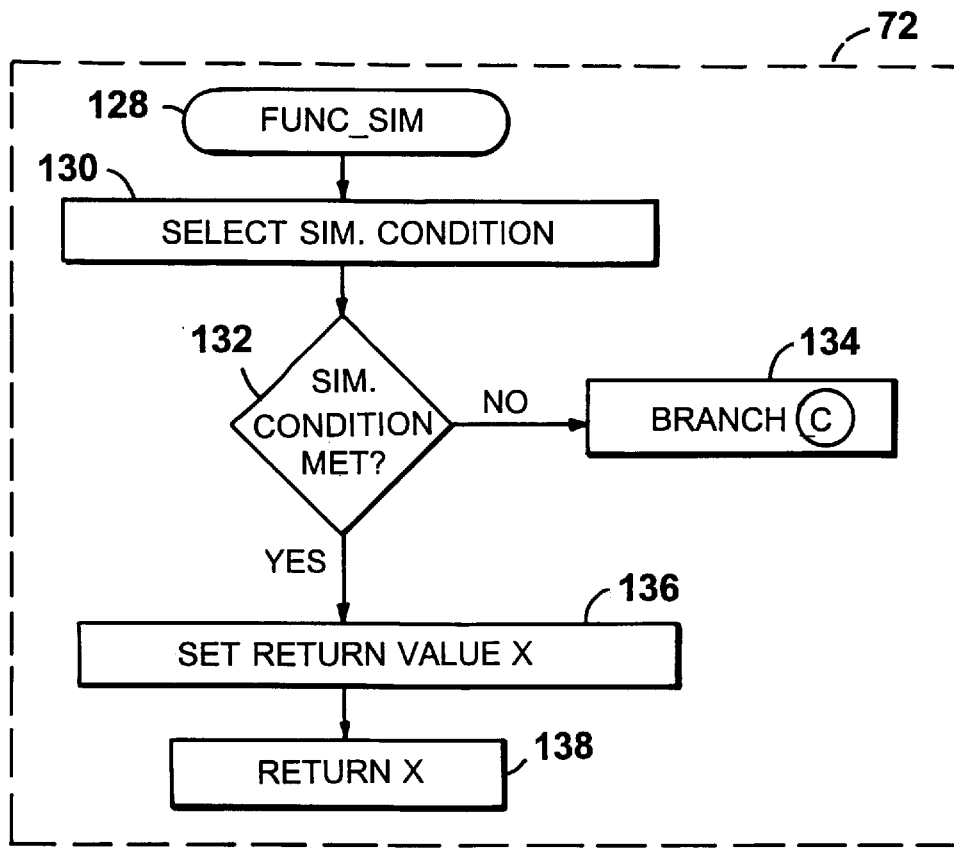
FIG. 10 is a flow chart of a general execution of simulation instructions.

Referring to FIG. 10, after branching to func_sim 128 in tclib 72, the computer selects (step 130) the simulation condition(s) from the condition table that corresponds to the function, for example, foo, from which the computer just branched. The computer then determines (step 132) whether the selected simulation condition has been met.

Tclib 72 has no knowledge of any function parameters (that is, arguments) or of the actual operation of the functions. The computer, therefore, only has data indicating which function, for example, foo, was called and the function (not shown) that called foo. Consequently, in the illustrated embodiment, the simulation condition is limited to: simulating the function every time the function is called; simulating the function after the function is called a certain number of times or a random number of times; or simulating the function when the function is called by a particular other function.

If the computer determines (step 132) that the simulation condition has not been met, then the computer branches (step 134) back to instr. a 28 (FIGS. 9a and 9b), executes instr. a 28, and branches (instruction 124) back to pre-existing instr. b 30 to normally complete pre-existing function foo. If, on the other hand, the computer determines (step 132) that the simulation condition has been met, then the computer sets (step 136) a return value X to a value equal to the simulation result selected by the programmer (that is, the value stored in the condition table). Return value X may be set to a particular value, in which case, the computer returns (step 138) that value to the function (not shown) that called function foo, or return value X may be set to a particular function name, in which case, the computer calls that particular function. If the return value X is set to a particular function name, then the computer executes that function instead of function foo.

Typically, a programmer tests hard-to-reach application code by replacing the return value of one or more functions with a value (that is, the programmer sets the simulation result equal to a value) that creates (falsely) an operating condition and causes the computer to execute the hard-to-reach code. However, if the return value of a function to be simulated is complex, for example, a structure having, for instance, one or more sub-structures or fields, the programmer may write a test function including a complex return value or instructions that calculate the complex return value.

Provided the particular function that is selected as the return value operates only on the original function's (for example, foo's) parameters, then the particular function may be a pre-existing application function or a test function (that is, a function independent of the programmer's application and designed specifically to test the programmer's application). Test functions may be written by the programmer in one or more source code files, including existing application source code files. These files are then re-compiled with compiler 14 (FIG. 4), re-pre-linked using instrumentor 64, re-linked with linker 20, and re-post-linked with post-linker 75 to generate a new simulatable executable file a.sim 76'. The programmer may then select a function for simulation and select a test function as the return value such that when selected simulation conditions are met, the test function is executed instead of the function selected for simulation.

To provide more complex simulation conditions, for example, a simulation condition that relies on the value of the pre-existing function's parameters, and to allow the programmer to input values for the simulation conditions at run time, the programmer may write replacement functions in one or more separate source code files using an Application Program Interface (API). The API defines a list of rules that dictate how a replacement function is written (described in more detail below) and a list of functions available in tclib that can be invoked by replacement functions. These functions include a fetch_inputs function that fetches programmer inputs from an input table (described below) and an orig_func function that causes the computer to execute the original function (described below).

Figure 11:
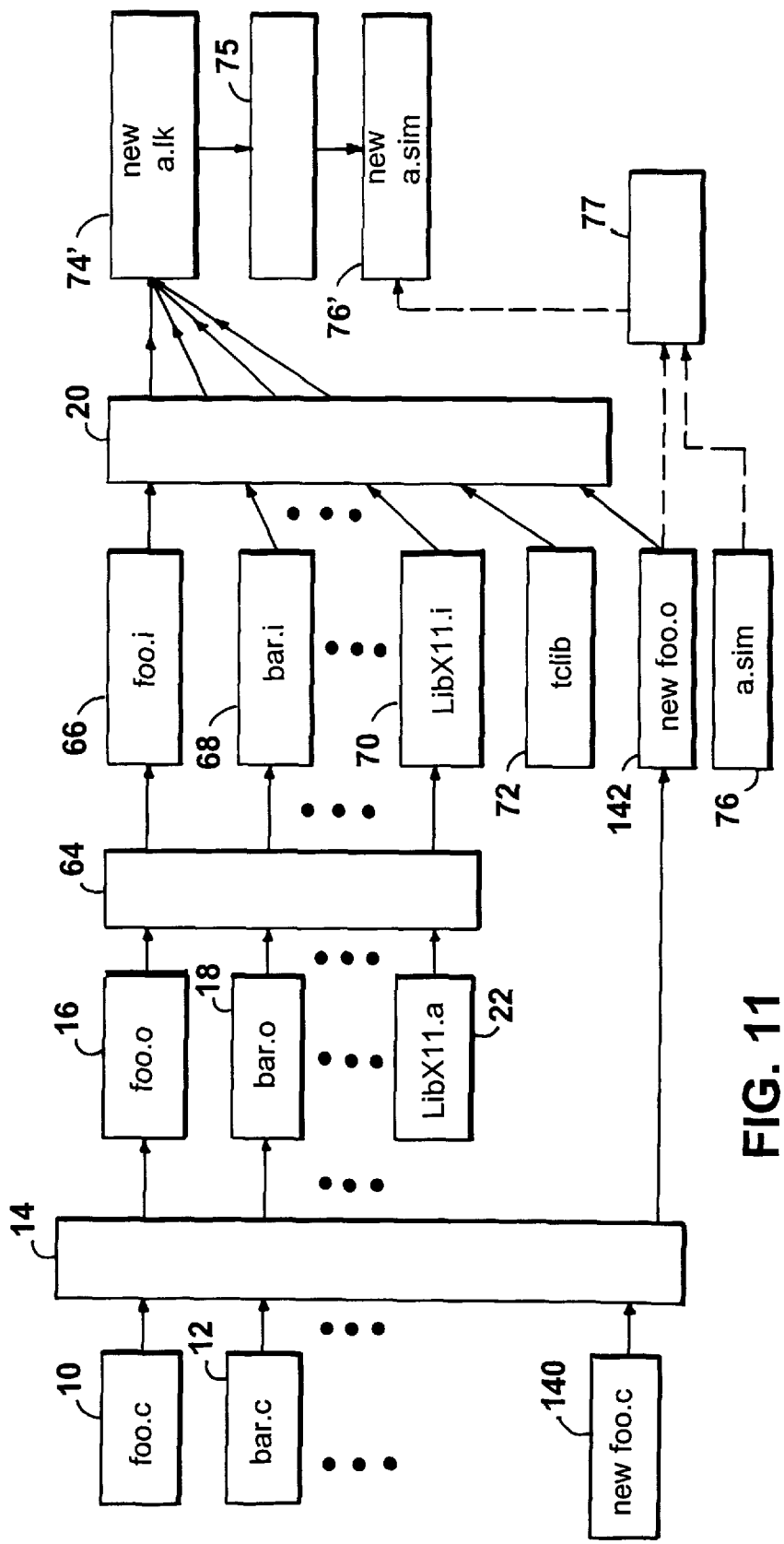
FIG. 11 is a block diagram showing the relationship between a replacement function source code file, generated with an Application Program Interface, and a new simulatable executable file.

In accordance with the rules of the API, within a replacement function source code file, the programmer writes one or more replacement functions and a replacement table. For each replacement function in the file, the replacement table includes the name of the function to be replaced (for example, foo), the name of the replacement function (for example, new_foo), and the replacement conditions to be input by the programmer at run time. Referring to FIG. 11, the programmer then compiles the replacement function source code file, for example, new_foo.c, with compiler 14 to generate a replacement function object file, new_foo.o. The programmer then links new_foo.o and the intermediate object files, including, for example, foo.i, with linker 20 to generate new a.lk 74', and post-links new a.lk 74' with post-linker 75 to generate new simulatable file a.sim 76'.

Alternatively, replacement object file new_foo.o is dynamically linked with pre-existing a.sim 76 by dynamic linker 77 (called ld.so on a ®Sun Microsystems, Inc., ®Sparc computer) to generate new simulatable file a.sim 76'. Using dynamic linker 77 is generally much faster than re-linking and re-post-linking all of the object files. With such an arrangement, a library of replacement functions may be written and particular replacement functions from that library may be selectively, dynamically linked at run time with simulatable executable file a.sim 76 to generate new a.sim 76'.

Referring back to FIG. 8, when the GUI is invoked (step 230), the computer reads (step 232) new a.sim 76' and determines whether new a.sim 76' includes any replacement tables. If new a.sim 76' includes replacement tables, then the GUI extracts the information from these tables (including the function to be replaced, the name of the replacement function, and the replacement conditions to be input by the programmer) and holds them in a replacement list. As discussed above, the GUI also reads (step 232) new a.sim 76' to determine what functions are available for simulation and then displays (step 234) one or more of the available functions. When the programmer selects (step 235) a function, for example, foo, the GUI searches (step 300) the replacement list to determine if the function has a corresponding replacement function, for example, new_foo. If there is no corresponding replacement function, then the computer returns to step 236 and the GUI displays the simulation conditions and simulation results for the selected function. If there is a corresponding replacement function, then the GUI displays (step 301) only the possible simulation conditions and the programmer then selects (step 302) one or more of those simulation conditions. The GUI then displays (step 303) the list of replacement conditions, and the programmer inputs (step 304) values for those replacement conditions.

After the programmer has finished selecting functions to be simulated and their associated simulation conditions and simulation results or replacement conditions, the programmer can (step 240) have the computer execute (step 241) new a.sim 76'. As discussed above, the tclib instructions within new a.sim 76' cause the computer to query (step 242) the GUI to determine which functions have been selected for simulation, and with this information, the tclib instructions cause the computer to generate (step 244) the condition table before executing (step 247) the application program instructions. During step 242, the tclib instructions within new a.sim 76' also cause the computer to query (step 242) the GUI to determine if any functions were selected for simulation that have corresponding replacement functions and if so, the replacement conditions input by the programmer. With this information, the tclib instructions cause the computer to generate (step 244) an input table which includes an entry for each replacement function corresponding to a selected function to be simulated. Each entry includes the replacement conditions input by the programmer for the corresponding replacement function.

Referring again to FIGS. 9a and 9b, during the execution of the application program instructions, when function foo is called, branch instruction 114 causes the computer to jump to the added simulation check instructions and determine (step 118) whether the function is to be simulated. As described above, this determination involves fetching and jumping to the address stored in the first slot of an entry corresponding to the function foo. If, as in this example, foo was selected for simulation, then the address in the first slot is equal to the address in the third slot which corresponds to the address of branch instruction 126. Consequently, the computer executes branch instruction 126 which causes the computer to jump to func_sim 128 within tclib. Referring to FIG. 10, the computer selects (step 130) the simulation condition(s) from the condition table and determines whether the simulation condition(s) has been met. If the simulation condition has not been met, then function foo is executed normally, and if the simulation condition has been met, then the return value is automatically set to the replacement function new_foo, such that replacement function new_foo is called.

Figure 12:
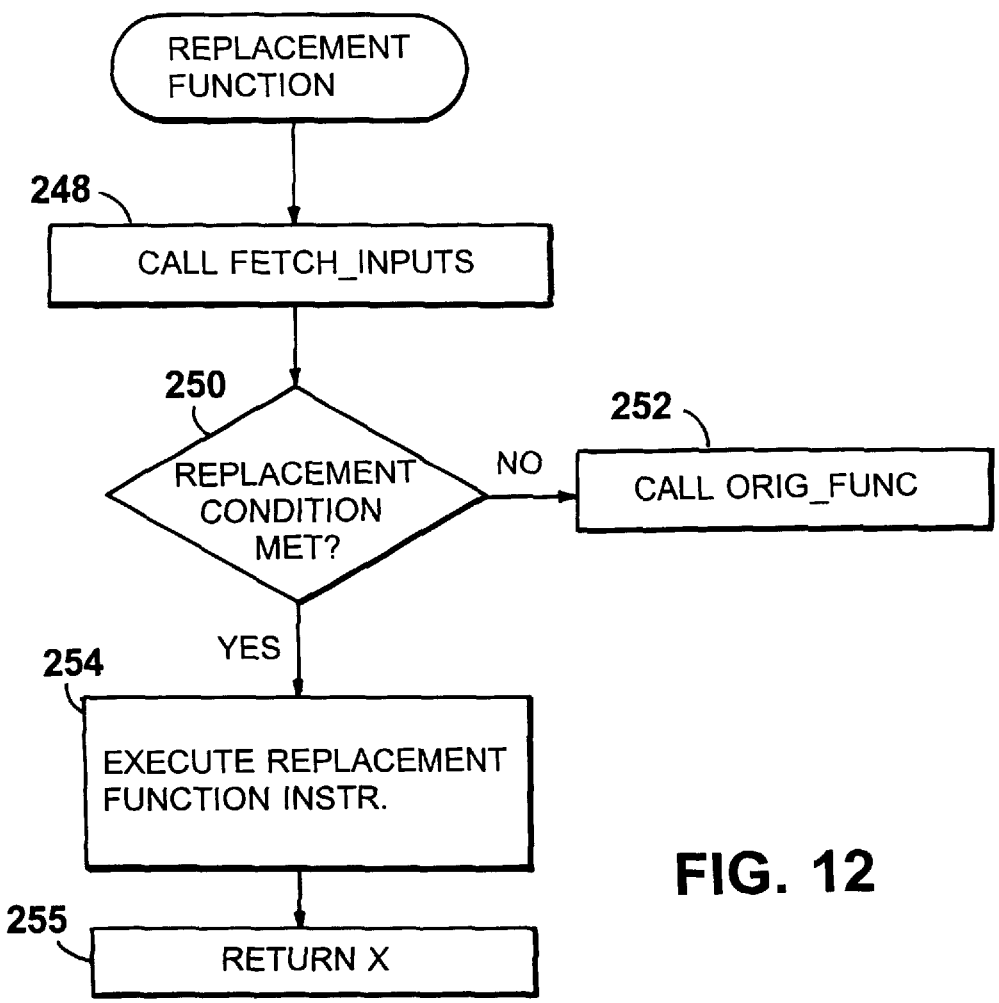
FIG. 12 is a flow chart of a general execution of a replacement function.

Referring to FIG. 12, when replacement function new_foo is called, the computer executes (step 248) a call instruction, within the replacement function in accordance with the rules of the API, to the fetch_inputs function in tclib. As described above, function fetch_inputs causes the computer to read the input table and determine what inputs the programmer provided for the replacement conditions. Using these values, the computer then determines (step 250) whether the replacement conditions have been met. If the replacement conditions have not been met, then the computer executes (step 252) a call instruction, within the replacement function in accordance with the rules of the API, to the orig_func function in tclib. This function causes the computer to jump to the address location of the first instruction, for example, instr. a 28 (FIG. 9a), in the added simulation check instructions for function foo and execute function foo normally. If the replacement conditions have been met, then the computer executes (step 254) the remaining replacement function instructions to generate a return value which the computer then returns (step 255) to the function that called function foo.

As an example, function foo is a save-to-disk function, and the programmer wants to replace (that is, simulate) foo with new_foo the fifth time function foo is called and only when a particular file is being saved to disk. To do this, the programmer writes a replacement function having two replacement conditions; a file name condition and a read/write (that is, read/save) condition. After generating the new executable file to include the replacement function, the programmer invokes the GUI and selects foo as the function to be simulated. The programmer also selects "the fifth time function foo is called" as the simulation condition. The GUI then displays the two replacement conditions and the programmer inputs the desired file_name and write as the values for the replacement conditions. As a result, the fifth time function foo is called, tclib will call replacement function new_foo, and when the particular file name input by the programmer is being saved to disk, then the remaining instructions within replacement function new_foo will be executed to calculate a return value to be returned to the function that called foo.

Replacement functions provide the programmer with great flexibility as to replacement conditions and return values. The programmer's replacement conditions have full access to the parameters available to the function being replaced. For instance, instead of simulating foo when a particular file name is being saved, foo could be simulated when one particular file is replacing another particular file, or foo could be simulated when a particular file name and file type are being saved. These are only a few of the many replacement conditions that the programmer can write.

The replacement function and test function instructions can be used to change the behavior of the programmer's application. For instance, where a previous execution indicated that one or more functions did not properly handle a simulated operating condition, the programmer may write replacement functions to include possible code fixes and execute a.sim 76' to determine if the code fixes solved the problem. This can also allow a programmer to test alternative code fixes and determine which fix works before the programmer actually alters the source code to include the fix.

Every time an application function (that is, a pre-existing function) is called, the computer places a new frame, holding that function's parameters, on a stack. The stack is an allocated portion of memory, and each frame represents one segment of that memory. When a replacement or a test function is called, the computer does not create a new frame. The existing function frame is preserved so that the application function's parameters are presented to either the replacement or test function if the simulation condition is met or to the application function if the simulation condition is not met. For example, in a ®Sun Microsystems, Inc., ®Sparc computer, parameters are passed through register windows, and when a function is called, space is allocated on the stack to save the values in the register window corresponding to the called function. To preserve the existing function frame, the values in these registers are either not changed or, where the values are changed, prior to changing the values, they are saved so that later they may be restored.

Simulation check instructions 88 (FIG. 9a) consist of approximately twenty instructions. The majority of the simulation code, including the code to check if the simulation conditions are met, resides in object file tclib 72 (FIG. 4), and, as a result, the size of each intermediate object file foo.i 66, bar.i 68, and libX11.i 70, is not significantly larger than the size of the pre-existing object file foo.o 16, bar.o 18, and libX11.a 22. Most computers execute the simulation check instructions in a matter of microseconds. Thus, when no functions are to be simulated, the execution time of a.sim 76 (FIG. 4) is not significantly longer than the execution time of a.out 24 (FIG. 1). Similarly, where functions are simulated with a return of particular values, the simulation may require less time than the actual execution of the pre-existing functions; and where replacement or test functions are created and used to replace pre-existing functions, the execution time of the new function is likely to be comparable to the execution time of the pre-existing function and, therefore, should not increase the overall execution time of a.sim.

Libraries

Often, a programmer will want to simulate functions in libraries, including third party libraries. There are typically two different types of libraries, a "static" library and a "shared" library. Static libraries are instrumented in a manner similar to the procedure described above, while shared libraries are not instrumented until run time (described in more detail below). Generally, a static library consists of one or more component object files each of which has one or more functions, and a shared library consists of one object file having one or more functions.

Referring again to FIG. 5, while executing instrumentor 64 and after determining (step 82) that a file, for example, libX11.a 22 (FIG. 4), is a library, the computer determines (step 160) whether the library is a static or shared library. If the library is a static library, then the computer decomposes (step 162) the static library into its component object files. The computer then selects (step 164) a first component object file and then selects (step 166) a first function available for simulation within the first component object file. The computer adds (step 168) simulation check instruction address space and simulation flags, and generates and adds a simulation table, as described above, to the component object file (and where a complex instrumentor 64', FIG. 4, is used instead of instrumentor 64 and post-linker 75, the computer also adds (step 170) simulation check instructions and possibly a branch instruction pointing to the address location of the inserted simulation check instructions at the original address location of the function's first instruction). The computer then determines (step 172) whether the component object file contains any more functions available for simulation. If so, the computer selects (step 174) the next function and repeats steps 168 and 172 (and step 170 where complex instrumentor 64' is used) for each remaining, available function. If no more functions are available within the component object file, the computer determines (step 176) whether the library contains any more component object files. If there are more component object files, the computer selects (step 178) the next component object file and repeats steps 166–176. If there are not more component object files, the computer recomposes (step 180) the instrumented component object files into an intermediate library (that is, a new version of the library), for example, libX11.i 70, and is finished (step 182) generating the intermediate library.

Referring to FIG. 13, a shared library on a ®Sun Microsystems, Inc., ®Sparc computer consists of one object file 184 having a procedure linkage table 186 (PLT) and one or more functions 188, 190, 192. PLT 186 contains one slot 186a, 186b, 186c for each function 188, 190, 192 within the shared library. Each slot contains instructions which branch to the address of the corresponding function. The computer then jumps to that slot address and executes the slot instructions in order to jump to the address of and execute the shared library function. For instance, if function car 190 is called, the computer branches to slot car 186b and then branches to and executes function car 190.

Referring again to FIG. 5, if in step 160 the computer determines that the object file is a shared library, the computer is done (step 196) with instrumentor 64. Referring again to FIG. 8, at run time, after the step (step 244) of generating the condition table and the input table, instructions in tclib cause the computer to determine (step 245a) whether any of the functions selected for simulation are shared library functions. If a shared library function has been selected for simulation, then the computer saves the address, shrd_func 199 (FIG. 14), found in the PLT slot of the corresponding function and replaces (step 245b) that address with an address, shrd_func_sim 200 (FIG. 14), in tclib.

Figure 14:
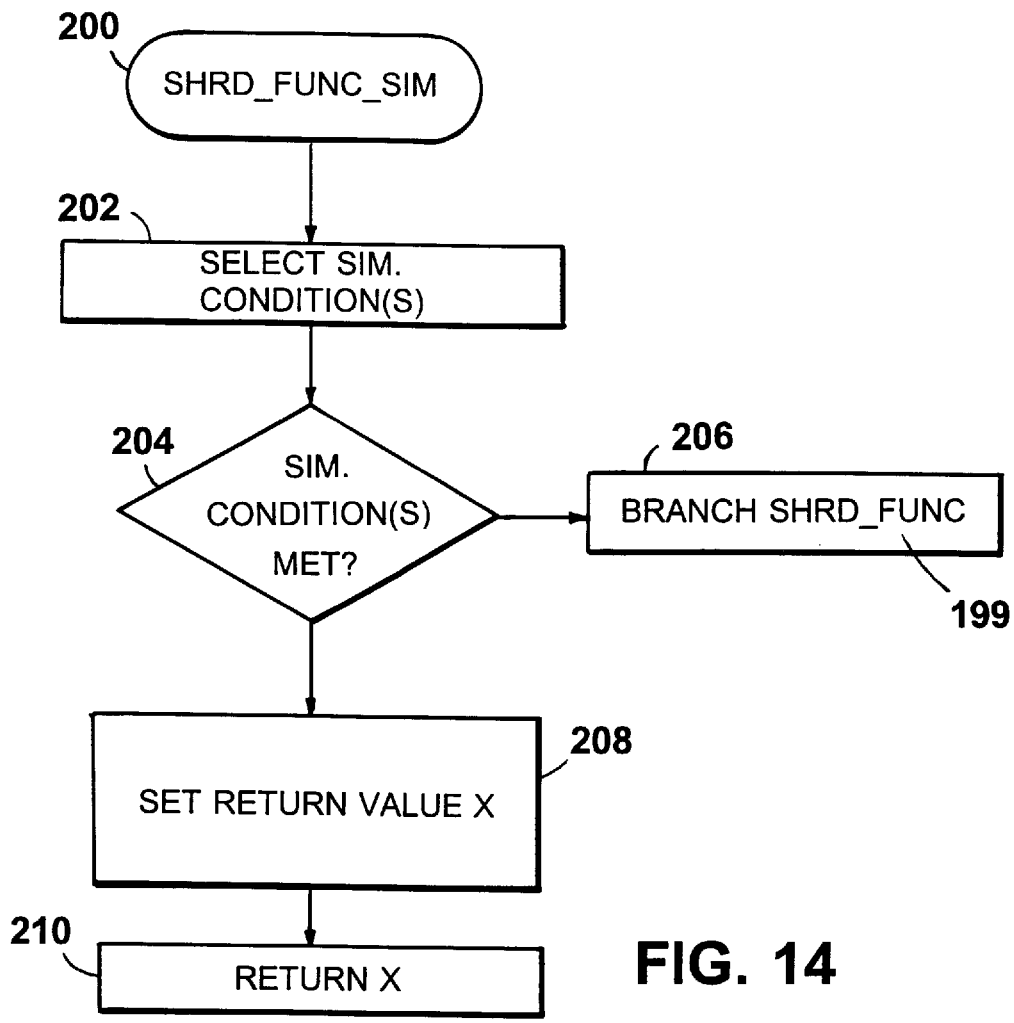
FIG. 14 is a flow chart of a general execution of simulation instructions for a shared library function.

Referring to FIG. 14, when a shared library function that was selected for simulation is called, the computer accesses the shared library's PLT slot corresponding to that function and branches to shrd_func_sim 200 within tclib. The computer then selects (step 202) the simulation condition(s) corresponding to the function from the condition table and determines (step 204) whether the simulation condition has been met. If the simulation condition has not been met, then the computer branches to shrd_func 199 (that is, the computer branches back to the original shared library function) and executes the shared library function normally. If the simulation condition has been met, then the computer sets (step 208) the return value X equal to the value stored in the condition table and then returns (step 210) that value to the function that called the shared library or the computer sets (step 208) the return value X equal to a replacement or a test function which generates a return value and returns that value to the function that called the shared library.

Additions, subtractions, and other modifications of the invention will be apparent to those practiced in the art and are within in the following claims.

What is claimed is:

1. A computer implemented method of simulating functions, wherein each function includes at least one machine readable instruction, comprising the step of:
   modifying machine readable code, the machine readable code including functions, to generate a simulatable executable file, including the step of adding simulation machine readable code including instructions for simulating functions selected for simulation, the instructions including a simulation condition under which a function is to be simulated and a simulation result;
   calling a function in the simulatable executable file;
   determining whether the simulation condition corresponding to the function is met and completing the called function normally if the simulation condition is not met and returning the simulation result if the simulation condition is met.

2. The method of claim 1, wherein:
   the step of modifying the machine readable code comprises adding a set of simulation check instructions for each function available for simulation, the simulation check instructions indicating whether each function available for simulation is a function selected for simulation;
   the method further comprises executing the simulation check instructions for each called function that is a function available for simulation, to determine whether the called function is the selected function, completing each called function normally if the called function is not the selected function, and, if the called function is the selected function, determining whether the simulation condition is met and completing each called function normally if the simulation condition is not met and returning the simulation result if the simulation condition is met.

3. The method of claim 2, wherein the step of modifying the machine readable code further includes the steps of:
   adding a simulation table having one entry corresponding to each function available for simulation; and
   wherein the simulation machine readable code further includes instructions for updating the simulation table upon the execution of the modified machine readable code, wherein the updated simulation table indicates which functions were selected for simulation.

4. The method of claim 3, wherein the simulation machine readable code is added to the machine readable code by linking the machine readable code and the simulation machine readable code.

5. The method of claim 4, wherein linking includes, for each function selected for simulation, the steps of:
   adding an original address location of a first instruction of the function to the corresponding simulation table entry; and
   adding an address location of the corresponding simulation check instructions to the corresponding simulation table entry.

6. The method of claim 2, wherein the step of modifying machine readable code includes, prior to the step of adding simulation check instructions, the step of:
   adding simulation check instruction address space and simulation flags to the machine readable code, for each function available for simulation within the machine readable code.

7. The method of claim 6, wherein each said added simulation check instruction address space is inserted after the machine readable code.

8. The method of claim 6, wherein each said added simulation check instruction address space is inserted before a first instruction corresponding to the function for which the simulation check instruction address space is added.

9. The method of claim 8, further including the steps of:
searching the computer readable code for offset parameters;
determining whether any located offset parameters require modification;
determining what modification is required for those offsets requiring modification; and
modifying those offset parameters requiring modification.

10. The method of claim 6, wherein each said set of simulation check instructions is added to the machine readable code in accordance with the simulation flags.

11. The method of claim 2, wherein the step of modifying the machine readable code further includes, after the step of adding the set of simulation check instructions for each function available for simulation within the machine readable code, the steps of:
copying a first instruction, of each function available for simulation, from an original address location into the corresponding added simulation check instructions; and
replacing, for each function available for simulation, the first instruction at the original address location with a branch instruction that points to a location of the corresponding inserted simulation check instructions.

12. The method according to claim 2, further comprising the steps of:
selecting at least one function to be simulated;
selecting at least one simulation condition corresponding to functions selected for simulation; and
selecting at least one simulation result corresponding to functions selected for simulation.

13. The method of claim 12, further comprising, before the step of selecting at least one function, the step of:
executing a graphical user interface, including the steps of:
reading the simulatable executable file to determine what functions are available for simulation within the simulatable executable file and to determine simulation conditions and simulation results corresponding to the simulatable functions; and
displaying at least one of the simulatable functions.

14. The method of claim 13, wherein after the step of selecting at least one function, the step of executing the graphical user interface further includes the step of:
displaying the simulation conditions and simulation results corresponding to selected functions.

15. The method of claim 12, wherein the simulation result is a value.

16. The method of claim 12, wherein the simulation result is a test function and wherein the step of returning the simulation result calls the test function.

17. The method of claim 12, further comprising, before the step of calling one or more of the functions:
determining whether any selected functions are shared library functions, and
if a selected function is a shared library function, storing a first address corresponding to the location of the shared library function and replacing the first address with a second address corresponding to a location within the simulatable executable file.

18. The method of claim 2, wherein the step of modifying the machine readable code further comprises the step of:
providing at least one replacement function to replace a function, wherein the replacement function includes at least one replacement condition.

19. The method of claim 18, wherein the step of providing at least one replacement function includes the step of:
writing a replacement function source code file.

20. The method of claim 19, wherein the replacement function is generated in accordance with an application program interface.

21. The method of claim 18, further comprising the steps of:
selecting at least one function to be simulated having a corresponding replacement function;
selecting at least one simulation condition corresponding to functions selected for simulation; and
selecting at least one replacement condition corresponding to each replacement function.

22. The method of claim 21, further comprising, before the step of selecting functions to be simulated, the step of:
executing a graphical user interface, including the steps of:
reading the simulatable executable file to determine the functions available for simulation within the simulatable executable file and to determine simulation conditions and simulation results corresponding to the simulatable functions; and
displaying at least one of the simulatable functions.

23. The method of claim 22, wherein after the step of selecting the functions to be simulated, the step of executing the graphical user interface includes the step of:
displaying the simulation conditions.

24. The method of claim 23, wherein after the step of selecting the simulation condition, the step of executing the graphical user interface includes the step of:
displaying the replacement conditions.

25. The method of claim 21, wherein the step of returning the simulation result comprises calling the corresponding replacement function.

26. The method of claim 25, further comprising the steps of:
determining whether the corresponding replacement condition is met;
if the replacement condition is not met, completing the selected function normally; and
if the replacement condition is met, executing the replacement function to generate a return value, and returning the return value to a function that called the selected function.

27. The method of claim 1, wherein the machine readable code is initially stored in an object code file.

28. The method of claim 1, wherein the simulation machine readable code is initially stored in an object code file.

29. The method of claim 1, wherein the simulation machine readable code further includes instructions for generating a condition table including a set of simulation conditions and simulation results corresponding to each function selected for simulation.

30. The method of claim 1, wherein:
the machine readable code comprises a plurality of object files;

the step of modifying the machine readable code comprises generating corresponding intermediate object files; and the method further includes the step of generating a simulatable executable file from the intermediate object files and from a simulation object file.

31. The method of claim 30, wherein the step of instrumenting the plurality of object files further includes the steps of:

generating a simulation table for each object file; and adding the simulation table to each corresponding intermediate object file.

32. The method of claim 1 wherein at least one of the functions available for simulation has a simulation condition under which the function is to be simulated every time it is called.

33. A computer implemented method of simulating a function, comprising the step of:

instrumenting computer readable code to include simulation check instructions for each function, within the computer readable code, that is available for simulation, wherein the step of instrumenting computer readable code includes the steps of:

generating intermediate computer readable code, which includes the steps of:

adding simulation check instruction address space and simulation flags to the computer readable code, for each function available for simulation within the computer readable code; and generating a simulation table and adding the simulation table to the computer readable code;

linking the intermediate computer readable code and a simulation object file to generate a linked executable file; and post-linking the linked executable file to generate a simulatable executable file, including the step of:

inserting simulation check instructions into the simulation check instruction address space according to the simulation flags.

34. The method of claim 33, wherein the step of post-linking the linked executable file further includes the steps of:

copying a first instruction, of each function available for simulation, from an original address location into the corresponding inserted simulation check instructions; and replacing, for each function available for simulation, the first instruction at the original address location with a branch instruction that points to a location of the corresponding inserted simulation check instructions.

35. A computer implemented method of simulating a function, comprising the step of:

instrumenting computer readable code to include simulation check instructions for each function, within the computer readable code, that is available for simulation, wherein the step of instrumenting computer readable code includes the step of:

generating intermediate computer readable code including the step of:

inserting simulation check instructions into the computer readable code for each function available for simulation within the computer readable code;

copying a first instruction, of each function available for simulation, from an original address location into the corresponding inserted simulation check instructions;

replacing, for each function available for simulation, the first instruction at the original address location with a branch instruction that points to a location of the corresponding inserted simulation check instructions; and generating a simulation table and adding the simulation table to the computer readable code.

36. A computer implemented method of simulating a function, comprising the steps of:

instrumenting computer readable code to include simulation check instructions for each function, within the computer readable code, that is available for simulation providing at least one replacement function for replacing an application function, the replacement function including at least one replacement condition, wherein the replacement function is generated in accordance with an application program interface, wherein the step of providing at least one replacement function includes the steps of:

writing a replacement function source code file;

compiling the replacement function source code file to generate a replacement function object file;

linking the replacement function object file with intermediate object files and a simulation object file to generate a replacement linked executable file; and post-linking the replacement linked executable file to generate the replacement simulatable executable file; and generating a replacement simulatable executable file including the replacement function.

37. A computer implemented method of simulating a function, comprising the steps of:

instrumenting computer readable code to include simulation check instructions for each function, within the computer readable code, that is available for simulation;

selecting at least one function to be simulated;

selecting at least one simulation condition;

selecting at least one simulation result; and executing a simulatable executable file including the instrumented computer readable code, wherein the step of executing the simulatable executable file includes the steps of:

generating a condition table;

calling one or more of the functions in the simulatable executable file;

executing the simulation check instructions for each called function that is a function available for simulation to determine if the called function is the selected function;

if the called function is not the selected function, completing the called function normally, and if the called function is the selected function, determining whether the selected simulation condition is met; and if the simulation condition is not met, completing the selected function normally; and if the simulation condition is met, returning the simulation result.

38. The method of claim 37, wherein the simulation result is a value.

39. The method of claim 37, wherein the simulation result is a test function and wherein the step of returning the simulation result calls the test function.

40. The method of claim 37, wherein before the step of calling one or more of the functions, the step of executing the simulatable executable file further includes the step of:

determining whether the selected function is a shared library function, wherein if the selected function is a shared library function, the step of executing the simulatable executable file further includes the step of:

storing a first address corresponding to the location of the shared library function and replacing the first address with a second address corresponding to a location within the simulatable executable file.

41. A computer implemented method of simulating a function, comprising the step of:

instrumenting computer readable code to include simulation check instructions for each function, within the computer readable code, that is available for simulation;

providing at least one replacement function for replacing an application function, the replacement function including at least one replacement condition, wherein the replacement function is generated in accordance with an application program interface, wherein the step of providing at least one replacement function includes the step of:

writing a replacement function source code file;

generating a replacement simulatable executable file including the replacement function;

executing a graphical user interface, including the steps of:

reading the replacement simulatable executable file to determine the functions available for simulation within the new simulatable executable file and to determine simulation conditions and simulation results corresponding to the simulatable functions; and displaying at least one of the simulatable functions;
selecting the application function to be simulated;
displaying the simulation conditions selecting a simulation condition;
displaying the replacement conditions; and
selecting a replacement condition; and executing the replacement simulatable executable file, wherein the step of executing the replacement simulatable executable file includes the steps of:

generating a condition table;

calling one or more of the functions in the replacement simulatable executable file;

executing the simulation check instructions associated with each called simulatable function to determine if the called simulatable function is the selected function;

if the called simulatable function is not the selected function, completing the called simulatable function normally; and if the called simulatable function is the selected function, determining whether the selected simulation condition is met; and if the simulation condition is not met, completing the selected function normally; and if the simulation condition is met, calling the replacement function.

42. The method of claim 41, wherein the step of executing the replacement simulatable executable file further includes the steps of:

determining whether the replacement condition is met;
wherein if the replacement condition is not met,
completing the selected function normally; and
wherein if the replacement condition is met,
executing the replacement function to generate a return value; and returning the return value to a function that called the selected function.

43. A computer implemented method for instrumenting a set of pre-existing machine instructions to produce a set of modified machine instructions, wherein machine instructions are machine readable instructions executable by a computer processor, said set of modified machine instructions having the ability when executed to simulate one or more functions of said set of pre-existing machine instructions, said method comprising the steps of:

instrumenting the set of pre-existing machine instructions to generate the set of modified machine instructions;

linking the set of modified machine instructions and a simulation object file to generate a linked executable file; and post-linking the linked executable file to generate a simulatable executable file, including the step of:

inserting simulation check instructions into the set of modified machine instructions for each function available for simulation within the set of pre-existing machine instructions.

44. The method of claim 43, wherein the step of post-linking the linked executable file further includes the steps of:

copying a first instruction, of each function available for simulation, from an original address location into the corresponding inserted simulation check instructions; and replacing, for each function available for simulation, the first instruction at the original address location with a branch instruction that points to a location of the corresponding inserted simulation check instructions.

45. A computer implemented method for instrumenting a set of pre-existing machine instructions to produce a set of modified machine instructions, wherein machine language instructions are machine readable instructions executable by a computer processor, said set of modified machine instructions having the ability when executed to simulate one or more functions of said set of pre-existing machine instructions, said method comprising the steps of:

instrumenting the set of pre-existing machine instructions to generate the set of modified machine instructions, including the step of:

adding simulation check instruction address space and simulation flags to the set of modified machine instructions for each function available for simulation within the set of pre-existing machine instructions;

linking the set of modified machine instructions and a simulation object file to generate a linked executable file; and post-linking the linked executable file to generate a simulatable executable file, including the step of:

inserting simulation check instructions into the simulation check instruction address space according to the simulation flags.

46. The method of claim 45, wherein the step of instrumenting the set of pre-existing machine instructions further includes the step of:

generating a simulation table and adding the simulation table to the set of modified machine instructions.

47. The method of claim 45, wherein the added simulation check instruction address space is inserted before a first instruction of the corresponding function.

48. The method of claim 45, wherein the added simulation check instruction address space is inserted after said set of pre-existing machine instructions.

49. The method of claim 48, wherein the step of post-linking the linked executable file further includes the steps of:
- copying a first instruction, of each function available for simulation, from an original address location into the corresponding inserted simulation check instructions; and
- replacing, for each function available for simulation, the first instruction at the original address location with a branch instruction that points to a location of the corresponding inserted simulation check instructions.

50. A computer implemented method for instrumenting a set of pre-existing machine instructions to produce a set of modified machine instructions, wherein machine instructions are machine readable instructions executable by a computer processor, said set of modified machine instructions having the ability when executed to simulate one or more functions of said set of pre-existing machine instructions, said method comprising the steps of:
- instrumenting the set of pre-existing machine instructions to generate the set of modified machine instructions, including the steps of:
  - inserting simulation check instructions into the set of modified machine instructions for each function available for simulation within the set of pre-existing machine instructions;
  - copying a first instruction, of each function available for simulation, from an original address location into the corresponding inserted simulation check instructions; and
  - replacing, for each function available for simulation, the first instruction at the original address location with a branch instruction that points to a location of the corresponding inserted simulation check instructions.

51. A computer implemented method of simulating a function, comprising the step of:
- instrumenting computer readable code to include simulation check instructions for each function, within the computer readable code, that is available for simulation, wherein the step of instrumenting computer readable code includes the step of:
  - generating intermediate computer readable code including the steps of:
    - inserting simulation check instructions into the computer readable code for each function available for simulation within the computer readable code; and
    - generating a simulation table and adding the simulation table to the computer readable code;
  - linking the intermediate computer readable code and a simulation object file to generate a linked executable file; and
  - post-linking the linked executable file to generate a simulatable executable file, including the steps of:
    - copying a first instruction, of each function available for simulation, from an original address location into the corresponding inserted simulation check instructions; and
    - replacing, for each function available for simulation, the first instruction at the original address location with a branch instruction that points to a location of the corresponding inserted simulation check instructions.

* * * * *